Patented Jan. 18, 1949

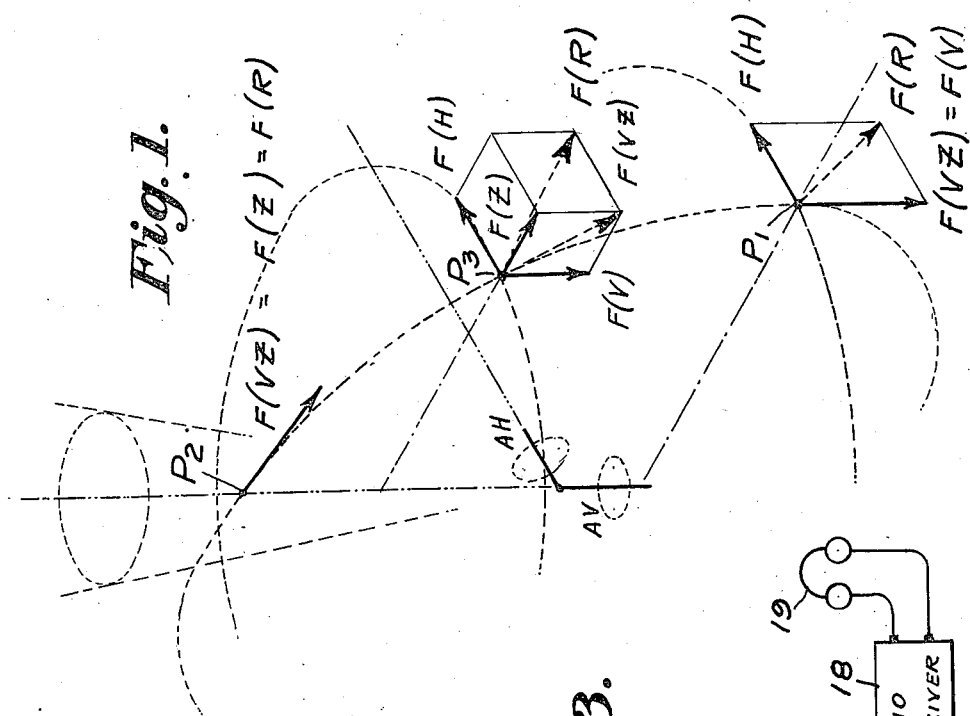
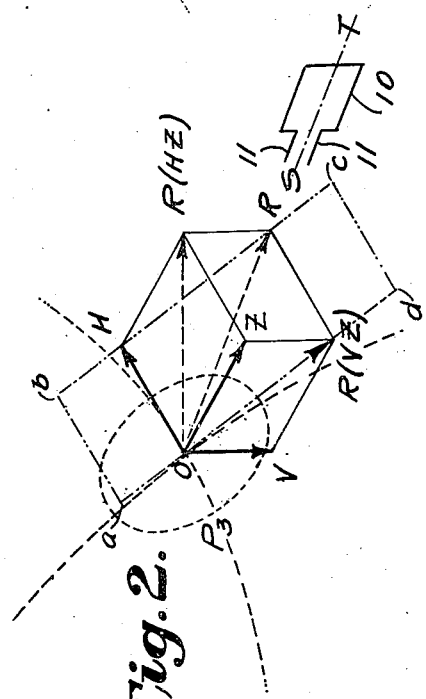
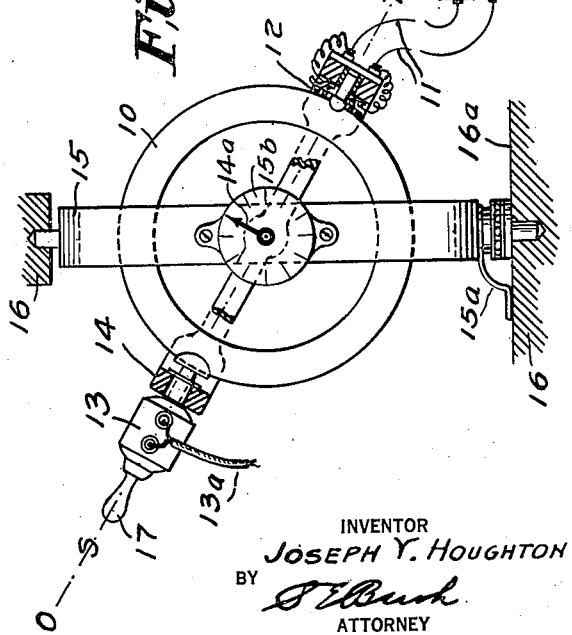
Jan. 18, 1949.  J. Y. HOUGHTON  2,459,165
METHOD AND APPARATUS FOR DETERMINING THE
THREE-DIMENSIONAL DIRECTION OF APPROACH
OF AN ELECTROMAGNETIC WAVE FRONT
Filed Nov. 11, 1944  3 Sheets-Sheet 1
INVENTOR
JOSEPH Y. HOUGHTON
BY
ATTORNEY Jan. 18, 1949.   J. Y. HOUGHTON   2,459,165
METHOD AND APPARATUS FOR DETERMINING THE
THREE-DIMENSIONAL DIRECTION OF APPROACH
OF AN ELECTROMAGNETIC WAVE FRONT
Filed Nov. 11, 1944   3 Sheets-Sheet 2
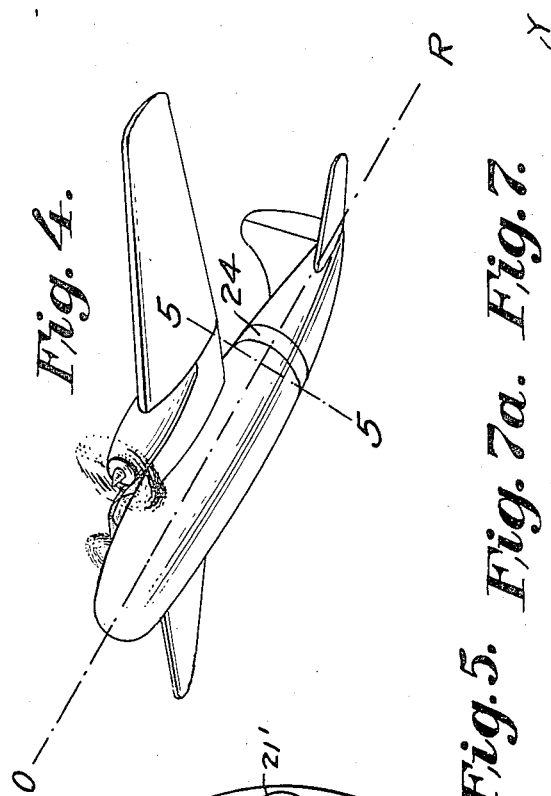
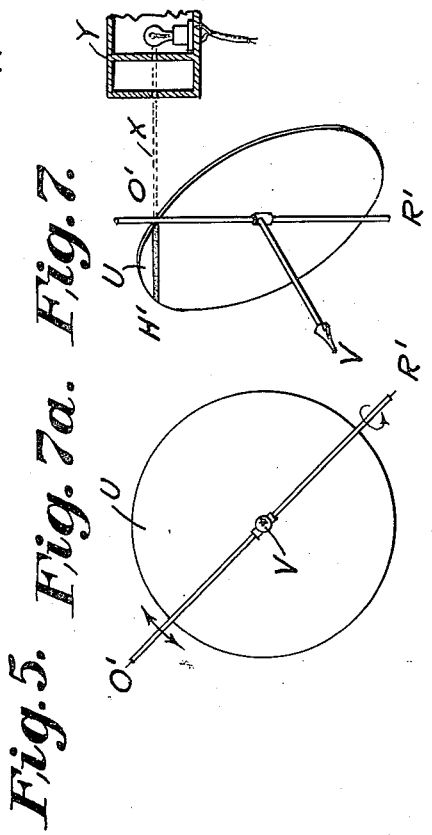
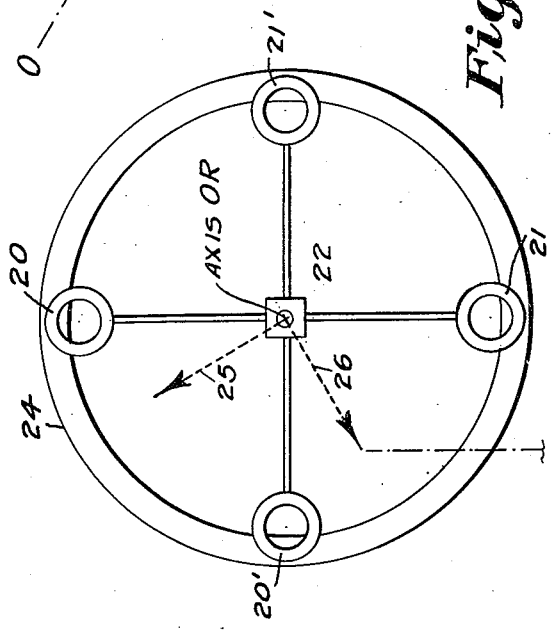
INVENTOR
JOSEPH Y. HOUGHTON
BY
ATTORNEY

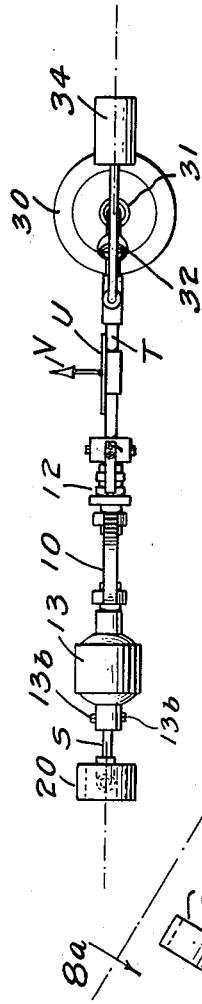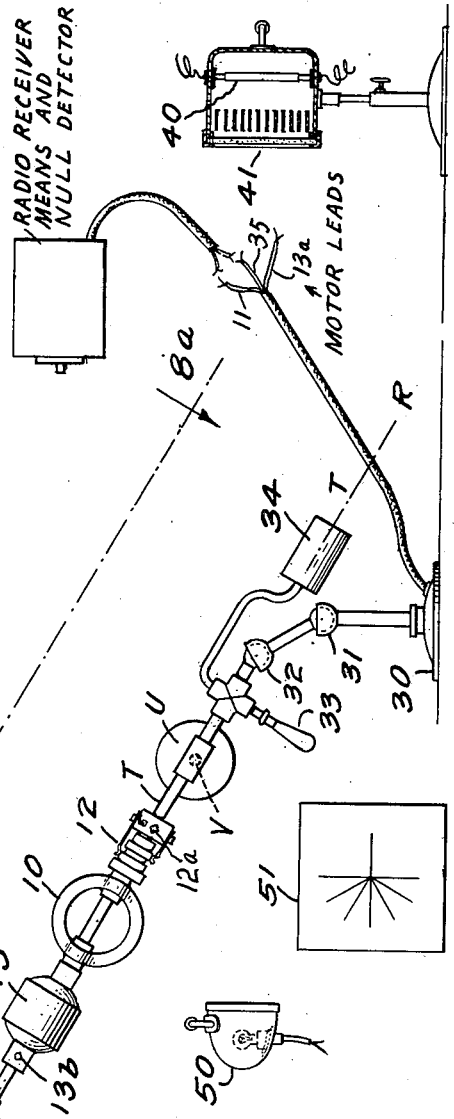

2,459,165

UNITED STATES PATENT OFFICE 2,459,165

METHOD AND APPARATUS FOR DETERMINING THE THREE-DIMENSIONAL DIRECTION OF APPROACH OF AN ELECTROMAGNETIC WAVE FRONT

Joseph Y. Houghton, Chevy Chase, Md.

Application November 11, 1944, Serial No. 563,044

16 Claims. (Cl. 343—115)

(Granted under the act of March 3, 1883, as amended April 30, 1928; 370 O. G. 757)

This invention relates to radio direction finding and aims generally to improve the same.

An object of this invention is to provide a method and means for determining the true azimuthal direction of incidence of an electromagnetic wave substantially free of aberration.

Another object is to provide an improved system enabling accurate determination of the azimuthal and vertical angles of approach of such wave substantially free of aberration error.

Previous to the present invention it was considered impossible to obtain reliably the three-dimensional angle of approach of an energy wave by means of simple loop antennas. As pointed out by R. Keene in "Wireless Direction Finding and Directional Reception," 2d ed., Iliffe and Sons Co., Ltd., London, pages 250 and 251, in such efforts an attempt was made to employ a vertical axis homing loop to determine the azimuthal plane of incidence of the wave, with a horizontal axis loop carried on the same base as the vertical axis loop and tiltable about the horizontal axis to determine the vertical angle. But as pointed out by Keene, if the received wave had no vertical component of magnetic flux, so that the azimuthal angle was accurately determined, then no vertical angle determination could be obtained, since then the horizontal axis loop would show a null for all positions of rotation about its axis. Conversely, if the received wave contained a vertical component of magnetic flux to which the horizontal axis loop could respond, then this very fact, producing inclination of the total magnetic field, would produce aberration error in the indication of the vertical axis loop, yielding an incorrect azimuthal angle, and producing serious error in the determination of both the horizontal and vertical angles of incidence of the wave.

Other attempts to use a similar system, for example that of Clemmer Patent No. 2,269,427, granted January 13, 1943, have likewise depended upon initial determination of the azimuthal direction of approach of the wave by a vertical axis homing loop, or the like, and while many efforts have been made to eliminate the effect of aberration due to the inclination of the magnetic field, these either unduly complicated the apparatus and procedure, or were of doubtful efficacy.

The present invention overcomes these difficulties by arranging and manipulating a simple loop system so as to automatically eliminate the effect of aberration. Thus, in its first aspect the present invention enables the azimuthal direction of approach of a radiant energy wave of inclined magnetic field to be determined without aberration; secondly, by determining accurately the azimuthal direction notwithstanding the inclination of the magnetic field, it enables the determination of the vertical angle of incidence free of the effects of aberration.

To this end the present invention aims to determine the three-dimensional angle of incidence of a radiant energy wave by determining the three-dimensional angle traced by the total resultant flux of the wave in the plane tangent to the wave front, and thereafter determining another line, intersecting said trace, and lying in said tangent plane, to thereby determine the angle of incidence of the wave-front. The invention herein described thus lies in the provision of a method and means for determining two lines lying in the plane tangent to the wave front, and in the underlying novel steps and apparatus features contributing to these ultimate ends, as will more fully appear from the following detailed description of preferred embodiments illustrative of the invention.

In the accompanying drawings:

Fig. 1 is a diagrammatic view illustrative of magnetic flux conditions in a radiant energy field having horizontally and vertically polarized components, in isometric perspective.

Fig. 2 is a similar vector diagram of flux conditions.

Fig. 3 diagrammatically illustrates an embodiment of means for determining the direction of resultant flux in the wave front.

Figs. 4, 5, 6, 7 and 7a are respectively a perspective, section, plan, and oblique and flatwise elevation views of apparatus for determining a second line related to the plane tangent to the wave front, the section of Fig. 5 being taken on the line 5—5 in Fig. 4.

Figs. 8 and 8a are elevation and plan views respectively of another form of apparatus for practicing the invention.

To facilitate an understanding of the invention, reference will first be had to the magnetic flux conditions in a radiant energy field in space having both horizontally and vertically polarized components. The most obvious means for creating such a field is the ordinary flat-top antenna shown in Fig. 1, having a vertical leg AV and a horizontal leg AH. With this arrangement, for example, the magnetic field F(H) from the vertical leg AV is concentric about the vertical leg and develops an accompanying electrostatic field which is vertical; while the magnetic field F(VZ) from the horizontal leg or flat-top AH is concentric thereabout and develops an electrostatic field which is horizontal. The resultant flux field, at any given point P, in space, may thus be represented by three flux-component vectors, one or more of which may be of zero value, i. e. a horizontal component F(H) tangent to the wave point, and vertically and azimuthally directed components F(V) and F(Z) at right angles to each other and to F(H), which result from resolution of the vector F(VZ) lying normal to F(H) in the plane tangent to the wave front. In the examples shown in Fig. 1 (representing an ideal case): (1) When the point P is located azimuthally from the transmitter, at point $P_1$, then F(VZ) is vertical and equals F(V), so F(Z) is zero, and the vertical plane which contains vectors F(V), F(H) and their resultant F(R) is in the plane tangent to the wave front. (2) When the point P is located zenithally relative to the transmitter, at point $P_2$, it is in the cone of silence for antenna leg AV so F(H) is zero; F(VZ) is horizontal and equals F(Z), so F(V) is zero, and the horizontal plane containing F(VZ)=F(Z)=F(R) is the plane tangent to the wave front. (3) When the point P is removed from the transmitter both azimuthally and zenithally, as at $P_3$, then F(VZ) is inclined and yields real values of F(V) and F(Z) which with F(H) determines the total flux field F(R) as one directed other than horizontally or vertically, i. e. as one in a plane inclined from the horizontal and vertical and normal to the upward and forward direction of propagation of the wave front. This last case is the general case and will be more fully discussed in connection with Fig. 2, in which, for convenience, the vectors corresponding to the several flux components referred to in Fig. 1 are designated with reference to their origin point and terminal points as is common in vector analysis, the point P being termed O, and the other ends of the vectors FV, FH, F(Z), F(VZ) and F(R) being identified as V, H, Z, RVZ and R, respectively. To facilitate discussion, the wave front is likewise represented diagrammatically by W in Fig. 2, the plane tangent to the wave front, by abcd, and the resultant of OH and OZ by OR(HZ).

As shown in Fig. 2, the wave front W at point O (which is shown as corresponding to the general case $P_3$, Fig. 1), is curved horizontally by the concentricity of the flux field OH about its origin (e. g. AV in Fig. 1), and is curved and tilted azimuthally by the concentricity of the flux field OR(VZ) about its origin (e. g. AH in Fig. 1). Thus the plane abcd tangent to the wave front W at point O, passes through the line OH and the vector resultants OR(VZ) and OR. Now if two lines can be located, in the plane abcd, so as to determine the position of that plane in space, clearly the three-dimensional angle of incidence of the wave front (normal to plane abcd) will be determined. Hence, the present invention aims to provide a method and means for determining two such lines. Further, if the line OH can be located, as distinguished from the line OR(HZ), then the azimuthal direction of incidence of the wave front can be determined free of aberration.

In the present invention, the first step is the location of the direction of total flux, OR, which traces one line in the plane abcd. This step may be effected in various ways, but the preferred apparatus comprises a loop antenna rotatable about its planar axis of symmetry and mounted for universal movement, or the electrical equivalent thereof. Such a loop antenna is diagrammatically indicated in its relative orientation at 10, in Fig. 2. When the loop antenna 10 is arranged with its symmetrical axis of rotation ST aligned with the flux lines OR, then the antenna output is a null in all positions of rotation of the antenna about the axis ST. So if the universally mounted antenna is rotated and at the same time turned in its mounting the position of line OR will be determined by the alignment of the axis ST when a minimum or null signal is received for all rotative positions of the antenna about the axis ST. In other words, this step of the method consists broadly in establishing the three-dimensional direction of the total flux lines OR tangent to the wave front, as by manipulating a directional antenna element or system in three dimensions to locate the same by the determinative alignment of its principal axis therewith.

Having determined the position of OR, the second step in this method is to determine another line determinative of the plane abcd. The vertical axis OV is determinate, but as explained by Keene, above, a second line determinative of plane abcd cannot be found by rotating a loop about OV as an axis, since the null would then be obtained when the loop aligned with OR(HZ), lying outside of plane abcd, and would thus be the false null of aberration. Nor can a loop be rotated about OH as an axis since the position of OH is unknown. Nor can a single loop having its plane normal to OR be swung around OR as an axis, since such a loop would in all positions be threaded by the same number of flux lines. In accordance with the present invention, therefore, phase discrimination is resorted to in an inclined plane including the axis OR. For this purpose, the present invention employs the axis OR, determined as above, as the axis of rotation of an antenna system comprising a pair of phase opposition connected antennas (identical loops symmetrically positioned on opposite sides of the axis of rotation OR) with their planes other than in alignment with OR in a coplanar sense (i. e. other than in the position of a pair of spectacles looking along the plane normal to OR). With this arrangement of the phase discriminating antennas they will each have some voltage induced in them at all times, and these induced voltages, on rotation of the system about OR mechanically (or by resort to the electrical equivalent) will always remain constant, but will vary in relative time phase as one antenna of the system lies closer to the transmitter than the other. With this arrangement, when the phase discriminating antenna system is adjusted about OR to the position in which it has induced in its two branches equal voltages, equal in time phase, then the common axis of the two branches will be in the plane abcd. A second line in plane abcd is thus determined and the position of the plane established. Thus the normal to the plane abcd is found, free from aberration effects, and is the aberrationless three-dimensional angle of incidence of the received wave front.

The foregoing explanation, while simple in its final analysis, has been particularly difficult to arrive at, since in all preconceived arrangements the art has sought to operate about a vertical or horizontal axis, in which event aberration is nearly always involved as a practical matter. By operating a phase discriminating system, not about a vertical or horizontal axis as in the prior art, but about the total flux axis OR, maximum voltages may be generated in the loops of the phase discriminating pair at all times, i. e. voltages equal in all angles of rotation of the pair about OR, and straight phase shift may be relied on to show the accurate direction of approach of the incident wave.

If desired, either or both loop systems may be continuously rotated about the orientable axis to be brought into alignment with OR, and such axis may be universally mounted either physically, or electrically by a goniometer system, and the orientation of axis ST to yield a pure null for all positions of rotation of loop 10 may be indicated electronically in oral or visual manner, while the angle of maximum phase difference between the two loops of the discriminating system may be indicated electronically, by an oscillograph, or otherwise.

One mode of arranging apparatus aboard an aircraft in accordance with the invention is diagrammatically indicated in Figs. 3 to 6. As shown in Fig. 3, for example, the loop 10 having flexible leads 11 coupled to it by slip rings 12 may be continuously rotated by an electrical or air motor 13 in a pair of gimbals 14, 15 arranged on a support 16 which may be stabilized gyroscopically or otherwise if desired. By any suitable means, as the handle 17, the gimbal mounted antenna 10 while rotating, may be oriented to any desired position in space to align its axis of rotation with the total flux axis OR, such position of alignment being indicated by the reception of a pure null in the rotating loop 10 (which may be suitably indicated as by radio receiver 18 and oral or visual indicating device 19), and being determined, if desired, by suitable azimuth and tilt indicators 15a and 14a, rotating with gimbal rings 15 and 14, relative to stabilized dials 16a and 15b, respectively.

Any suitable provision may be made for aligning the axis of rotation of the phase discriminating loop system with the axis OR, manually, by suitable follow-up mechanism, or otherwise. In the illustrative embodiment shown in Figs. 4 and 5 the phase discriminating loop system is arranged for apparent rotation of a pair of loops 20, 21 by the provision at right angles thereto of a second pair of loops 20', 21' with a goniometer connection of the loops 22 giving the effect of a pair of loops rotated about the axis OR. As shown in Fig. 4, the belt of apparent rotation of the loops may be arranged concentrically about the fuselage of an aircraft as indicated at 24, so that by flying the aircraft with its principal axis in alignment with the flux axis OR the phase discriminating loop system becomes aligned for rotation about said axis as shown in Fig. 5. Such alignment being attained, simple adjustment of the goniometer in the manner described in connection with Fig. 3 of my joint application with Edward L. Kilpatrick, Serial No. 520,692, filed February 1, 1944 (Patent No. 2,395,871 issued March 5, 1946), will suffice through indicator means of the type therein disclosed to indicate when the apparent position of the phase discriminating loop system is oriented in the position of no-phase difference between the loops or the position of maximum phase difference between them.

As above explained, in the position of no-phase difference the orientation of the loops or goniometer angle of no-phase difference 25, Fig. 5 corresponds with the second line in the plane abcd transverse to the line OR, serving with the line OR to establish the position of the plane abcd. Alternatively, with the loop system or goniometer adjusted to the maximum phase difference the indicated angle, as 26, Fig. 5, will correspond to the normal to the plane abcd, i. e. to the direction of incidence of the approaching wave front.

In either event suitable provision may be made by an optical or other system using follow-up mechanism if desired, to indicate the azimuthal and vertical angle of incidence, and the position of the line OH if this is desired. To indicate the azimuthal direction it will suffice to project onto a compass card or the like held normally in horizontal position by gyroscopic or other means, and indicated in Fig. 6, a horizontal projection of the goniometer phase difference angle, as indicated at 26'. At the same time, if desired, a like projection of the goniometer indicator position may be made against a stabilized vertical plane to indicate the vertical angle of approach of the wave front.

A simple mode of effecting this end is indicated in Fig. 7 in which a disk U, circular in the form shown, is pivoted on a planar axis O'R' and provided with a pointer V normal to its plane at the center of the axis O'R'. By follow-up mechanism or otherwise the axis O'R' is aligned in the position determined in Fig. 3. Thereafter the disk U and pointer V are rotated as a unit about the axis O'R' to the position corresponding with the indication 25 and 26 in Fig. 5, while maintaining the axis O'R' aligned in the direction OR. By projecting a horizontal wedge of light X from a suitable source Y against the disk U a trace O'H' is projected thereon corresponding to the position of the line OH in Fig. 2 when the proper adjustments have been made. At the same time the pointer V takes the position corresponding to the normal to the plane tangent to the wave front W in Fig. 2. In this arrangement the vertical projection of the pointer UV will lie at right angles to the trace O'H' and will indicate the azimuthal direction of approach of the wave front, while the projection of the pointer V against a vertical plane normal to the trace O'H' indicates the vertical angle of approach of the wave front. Obviously such projections may be made with light beams, lenses, prisms, or other suitable optical means.

To further illustrate the invention there is shown in Figs. 8 and 8a a second embodiment of apparatus for practicing it. In this embodiment a hollow shaft ST is mounted for unversal movement on a stabilized base 30, as by a series of ball and socket members 31, 32 preferably having sufficient friction to retain shaft ST and apparatus carried by it in any position to which it may be adjusted. The shaft ST, to facilitate adjustment, is preferably provided with a handle 33 and a counterweight 34. The rotating loop antenna 10 to be aligned with the flux axis OR is rotatably mounted on the shaft ST as an axis, with its driving motor 13 secured on the shaft as by set screw 13b. The antenna leads 11 leading from the slip ring contacts 12 suitably secured to the shaft as by set screw 12a, pass through the shaft ST and members 32, 31 and 30 and are carried out to radio receiver means, as 18 and 19 in Fig. 3. In the form shown the motor leads 13a from motor 13, are carried out in the same manner. When the shaft ST is manipulated to such position that a single null is received on rotating antenna 10, the shaft ST will be aligned with the flux field OR.

For phase discrimination about the axis OR, thus found, identical loop antennas 20 and 21 are mounted in symmetrical relation on opposite sides of the shaft ST as shown, and connected in phase opposition, with the terminal leads 35 carried out in any suitable manner as through the shaft ST as shown. These leads 35, as will be clear to those skilled in the art, are connected to a null detector or the like, generally similar to elements 18 and 19 in Fig. 3. Thus, when the shaft ST has been aligned with the flux direction OR, mere rotation of the shaft ST on its own axis by suitable means (as handle 33 and the ball and socket connection 32, in the form shown) effects a swinging of the phase discriminating antenna system 20, 21 about the flux axis OR and into alignment with the plane tangent to the wave front, as indicated by the null resulting from generation of equal voltages in the antennas 20 and 21, in the same time phase relation; or normal thereto, as indicated by the maximum signal difference resulting from generation of equal voltages in the antennas 20 and 21 with maximum time phase displacement. In general, operation of the system 20, 21 on the null point is preferred.

Suitable indicating means may also be associated with the shaft ST. For example, translucent disk U paralleling the antenna system 20, 21 and pointer V normal thereto, may be secured to the shaft ST; with a portable generator of parallel horizontal light waves, as fluorescent lamp 40 with the slotted hood 41 provided for projecting onto disk U the horizontal trace O'H' (cf. Fig. 7); and with suitable means as the portable lamp 50 and screen 51, by which the shadow of the pointer V may be projected to a horizontal surface to obtain azimuthal angle of incidence, or be horizontally projected, in the direction of the trace O'H', against the portable vertical screen 51, positioned normal to trace O'H', to obtain the vertical angle of incidence of the wave front.

Those skilled in the art will understand that the invention is not limited to the particular embodiments above described to illustrate the same and that various modifications can be made without departing from the invention.

The invention described herein may be manufactured and used by or for the Government of the United States of America for governmental purposes without the payment of any royalties thereon or therefor.

What is claimed is:

1. The method of determining the angle of incidence of a radiant energy wave front which consists in manipulating a directional antenna in three dimensions to establish, by the determinative alignment of its principal axis therewith, the three-dimensional direction of the resultant or total flux lines of the wave front, aligning a reference axis therewith, and thereafter establishing by manipulating a phase-discriminating system about the so-aligned reference axis as a center, the position of another line of the group comprising lines lying in the plane tangent to the wave front and lines normal to such plane, whereby the position of the tangent plane and the azimuthal and vertical angles of incidence of the wave front are determined.

2. A method of determining the three-dimensional angle of incidence of a radiant energy wave front which consists in orienting a rotating loop antenna in three dimensions until a pure null is received in all positions of rotation of the antenna, at which time the axis of rotation of the antenna corresponds in direction to the total flux axis; orienting the axis of rotation of a phase discriminating antenna system in alignment with the thus indicated total flux direction, and determining by phase discrimination a determinate position, of the group consisting of positions of no phase difference and positions of maximum phase difference, for rotation of the phase discriminating system about the flux axis as a center, which determinate position establishes the position of the plane normal to the wave front and the direction of incidence of the wave front normal thereto.

3. The method of determining the three-dimensional angle of incidence of a radiant energy wave front, with the aid of a simple loop antenna and a phase discriminating antenna system, which consists in orienting the simple loop antenna in the incident wave, while rotating it about its planar axis of symmetry, until it reaches the position in which the reception of the wave, in all positions of rotation of the loop, is a minimum or null; aligning the axis of rotation of the phase discriminating system with the axis of symmetry of the so oriented single loop; and determining, by phase discrimination, a determinate line of the group consisting of a line tangent to the wave front at right angles to said axis and the normal to said line and axis; thereby establishing the true position of the wave front and the three-dimensional angle of incidence of the wave.

4. A method according to claim 3, further comprising the steps of establishing the position of the plane defined by the axis of symmetry of the single loop and the planar axis of equal time phase reception of the phase discriminating system, with said single loop oriented for null reception in all positions of rotation and with said phase discriminating system oriented for null reception, which plane corresponds in orientation to the plane tangent to the incident wave front; and measuring the azimuthal orientation of the line normal to said plane and the vertical angle between said normal line and a horizontal plane.

5. A method according to claim 3, further comprising the steps of establishing the position of the plane defined by the axis of symmetry of the single loop and the planar axis of equal time phase reception of the phase discriminating system, with said single loop oriented for null reception in all positions of rotation and with said phase discriminating system oriented for null reception, which plane corresponds in orientation to the plane tangent to the incident wave front; establishing, as a line of reference, the trace of intersection of said plane with a horizontal plane, orienting a vertical plane normal to said trace of intersection, and measuring the vertical angle of a projection of said normal line on said vertical plane, thereby determining the vertical angle of incidence of the wave front; and measuring the azimuthal orientation angle of a projection of said normal line on a horizontal plane, thereby determining the azimuthal angle of incidence of the wave front.

6. Apparatus for determining the three-dimensional angle of incidence of a radiant energy wave front, comprising, in combination, a single loop antenna and a phase discriminating antenna system, said single loop antenna being rotatable about its planar axis of symmetry and being adjustably mounted to enable said planar axis to be oriented in any direction in space; said phase discriminating antenna system comprising an axis of symmetry and a pair of electrically identical loop antennas symmetrically spaced on opposite sides of said axis and connected in phase opposition; means for orienting the axis of symmetry of said phase discriminating antenna system in accordance with the orientation of the axis of symmetry of said single loop antenna; means for rotating said single loop antenna about its said axis; means for indicating the occurrence of null reception by said rotating single loop antenna when its said axis is aligned with the flux field of a wave front; means for rotating said phase discriminating antenna system about its axis of symmetry; and means for indicating minimum and maximum phase difference reception by said phase discriminating antenna system.

7. Apparatus according to claim 6, further comprising means for indicating the orientation of the plane containing the axis of symmetry of the single loop and the planar axis of equal time phase reception of the phase discriminating system with said single loop oriented for null reception in all positions of rotation and with said phase discriminating system oriented for null reception, which plane corresponds in orientation to the plane tangent to the incident wave front; and means for indicating the vertical angle, and the azimuthal orientation, of a line normal to said plane.

8. Apparatus according to claim 6, further comprising means for indicating the orientation of the plane containing the axis of symmetry of the single loop and the planar axis of equal time phase reception of the phase discriminating system with said single loop oriented for null reception in all positions of rotation and with said phase discriminating system oriented for null reception, which plane corresponds in orientation to the plane tangent to the incident wave front; and means for indicating the vertical angle, and the azimuthal orientation, of a line normal to said plane, comprising means for determining the orientation of the trace of intersection of said plane with a horizontal plane, means for determining the vertical angle of a projection of said normal line on a vertical plane normal to said trace, and means for determining the azimuthal orientation of a projection of said normal line on a horizontal plane.

9. An apparatus for determining the three-dimensional angle of approach of a radiant energy wave front, comprising, in combination, a directional antenna system for detecting the three-dimensional direction of the flux field of the wave front and means for aligning an axis therewith to establish the position in space of one line lying in the plane tangent to the wave front, and a phase-discriminating system operable about the so-aligned axis for determining the position in space of a second line transverse to the direction of the flux field and determinative of the position of said plane.

10. An apparatus for determining the three-dimensional angle of approach of a radiant energy wave front, comprising, in combination, a directional antenna system for detecting the three-dimensional direction of the flux field and the wave front and means for aligning an axis therewith to establish the position in space of one line lying in the plane tangent to the wave front, and a phase-discriminating system operable about the so-aligned axis for determining the position in space of a second line, transverse to the direction of the flux field and lying in said plane.

11. An apparatus for determining the three-dimensional angle of approach of a radiant energy wave front, comprising, in combination, a directional antenna system for detecting the three-dimensional direction of the flux field of the wave front and means for aligning an axis therewith to establish the position in space of one line lying in the plane tangent to the wave front, and a phase-discriminating system operable about the so-aligned axis for determining the position in space of a second line, transverse to the direction of the flux field and normal to said plane.

12. A method for determining the three-dimensional angle of approach of a radiant energy wave front, which comprises (a) detecting the three-dimensional direction of the flux field of the wave front and aligning an axis therewith to establish the position in space of one line lying in the plane of the wave front, and (b) determining, by phase discrimination about the so-aligned axis, the position of another line determinative of the plane tangent to the wave front.

13. A method for determining the three-dimensional angle of approach of a radiant energy wave front, which comprises (a) detecting the three-dimensional direction of the flux field of the wave front and aligning an axis therewith to establish the position in space of one line lying in the plane of the wave front, and (b) determining, by phase discrimination about the so-aligned axis, the position of another line transverse to the direction of the flux field and lying in said plane.

14. A method for determining the three-dimensional angle of approach of a radiant energy wave front, which comprises (a) detecting the three-dimensional direction of the flux field of the wave front and aligning an axis therewith to establish the position in space of one line lying in the plane of the wave front, and (b) determining, by phase discrimination about the so-aligned axis, the position of another line transverse to the direction of the flux field and normal to said plane.

15. In apparatus for the aberration-free determination of three-dimensional angles of incidence of radiant energy waves, in combination, directional receiving means for detecting the direction of the total flux axis of the wave front and thus determining a line tangent to the wave front, and a phase-discriminator arranged to operate about the so determined tangent line for establishing the position of the true normal to the wave front.

16. A method for aberrationless determination of three-dimensional angles of incidence of radiant energy waves, which comprises detecting the determinate direction of the total flux lines of the incident wave front to determine a plane including the normal to the wave front, and then comparing the time phase relation between portions of the wave at adjustable separated points in said plane to determine the direction in said plane of the normal to the wave front.

JOSEPH Y. HOUGHTON.

REFERENCES CITED

The following references are of record in the file of this patent:

UNITED STATES PATENTS

| Number | Name | Date |
|---|---|---|
| 2,269,437 | Clemmer | Jan. 13, 1942 |
| 2,297,249 | Runge | Sept. 29, 1942 |
| 2,379,909 | Kilpatrick | July 10, 1945 |